INVENTOR.
ARTHUR A. CURTIS
DOUGLAS D. SHERMAN
BY Teller & McCormick
ATTORNEYS

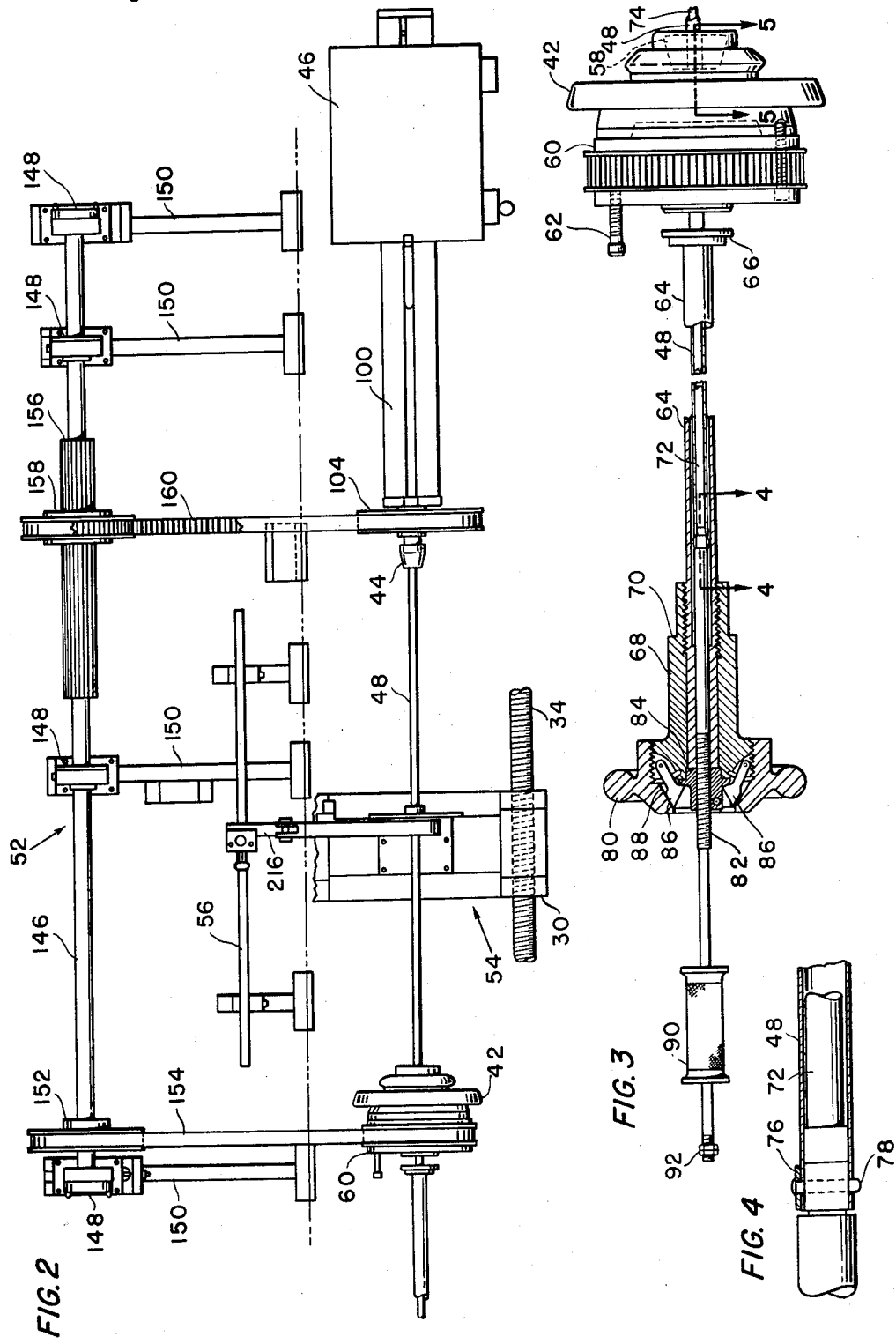

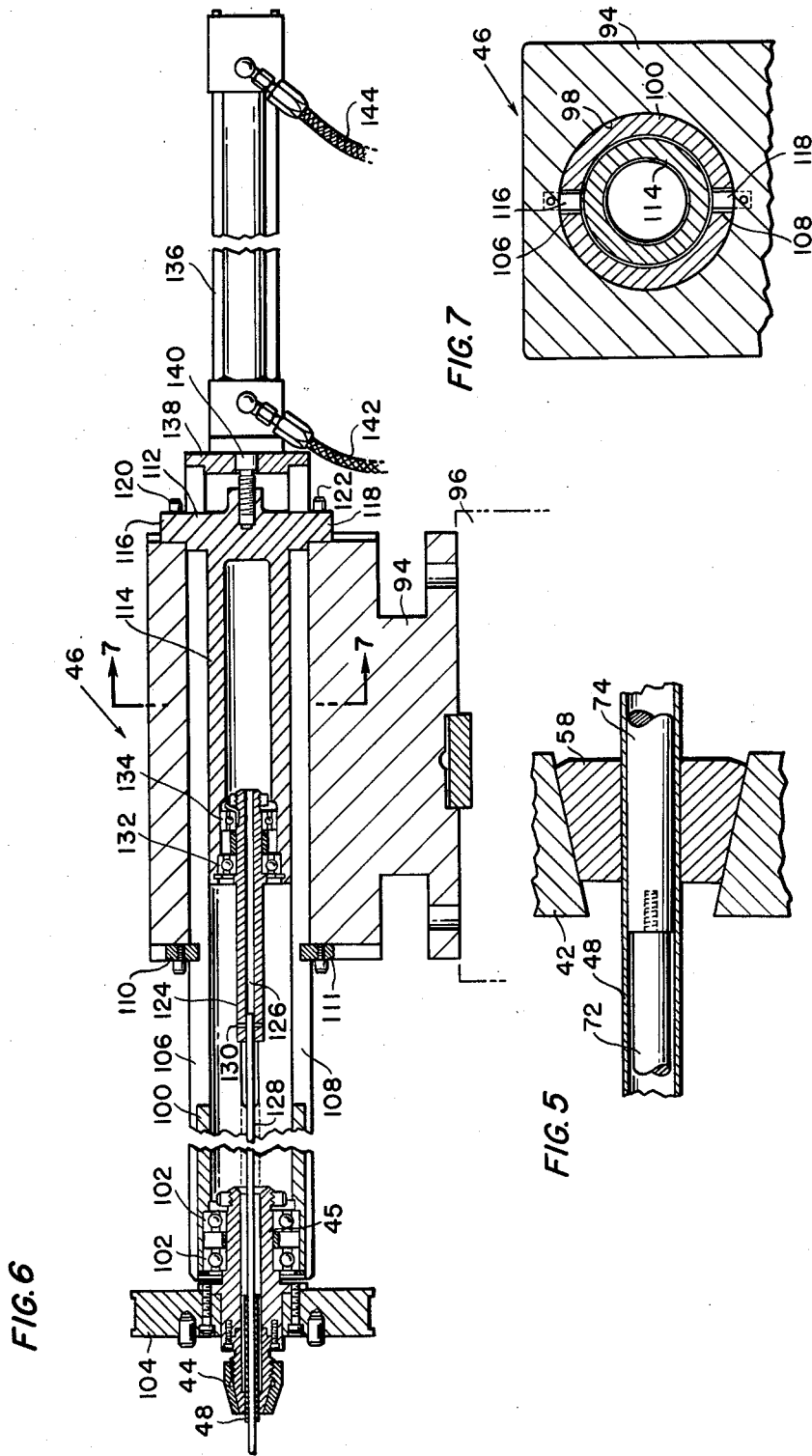

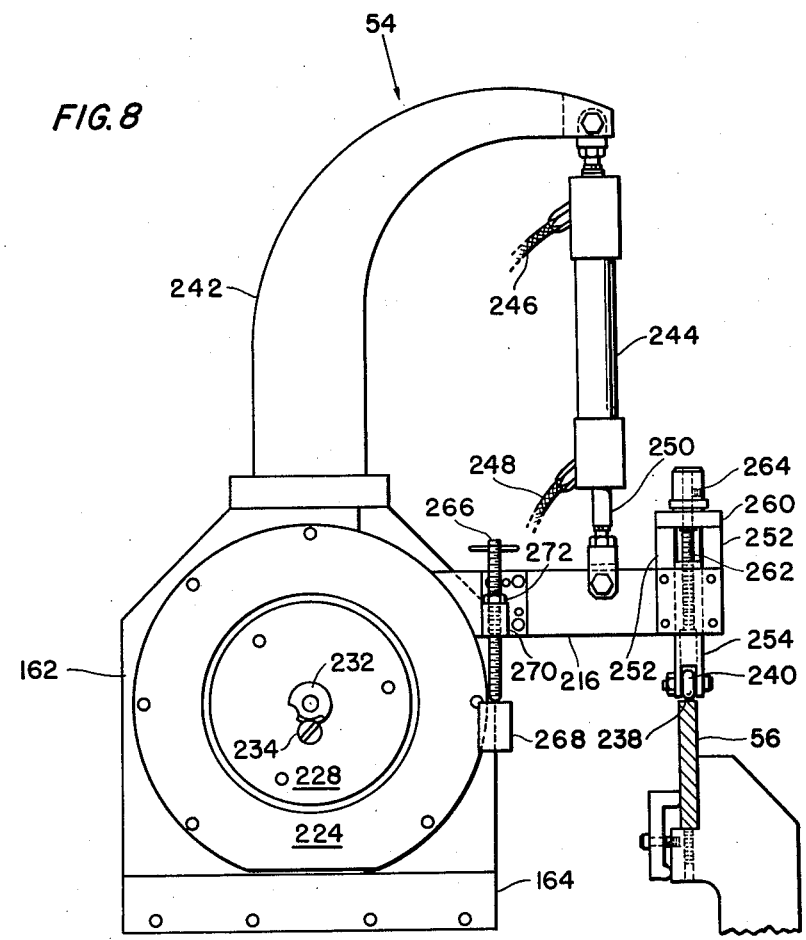

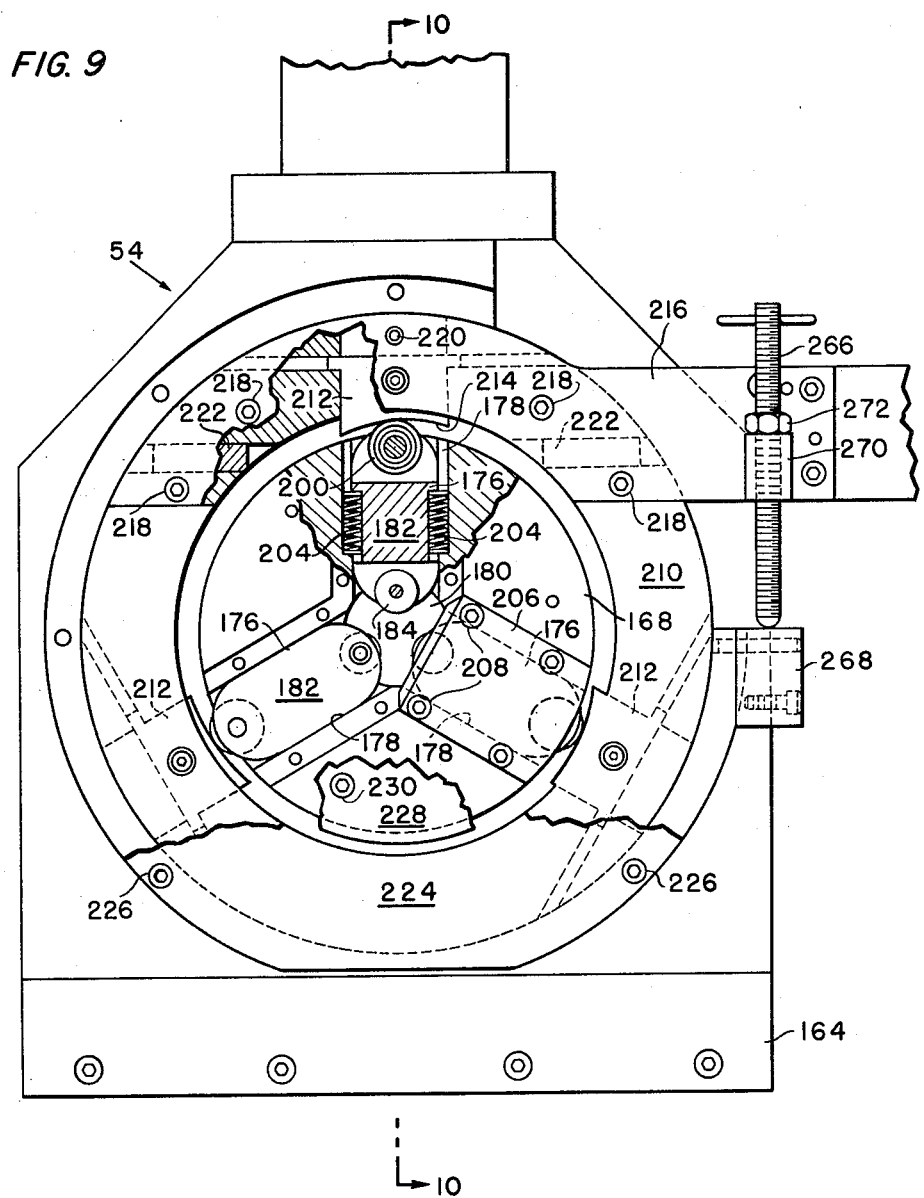

United States Patent Office 3,195,331
Patented July 20, 1965

3,195,331
TUBE DRAWING APPARATUS
Arthur A. Curtis, Wethersfield, Conn., and Douglas D. Sherman, Springfield, Mass., assignors to United Aircraft Corporation, East Hartford, Conn., a corporation of Delaware
Filed Aug. 22, 1960, Ser. No. 51,002
11 Claims. (Cl. 72—7)

This invention relates to tube drawing apparatus, and more particularly to such apparatus adapted to reduce the diameter of a tube by differing amounts at various positions along its length to produce a tube having a tapered or other nonuniform diameter profile.

The primary object of this invention is to provide tube drawing means for producing tubes of nonuniform cross section, such means being readily adaptable to produce tubes of different tapers or profiles and being capable of maintaining the wall thickness of the tubes within close tolerances along the entire length of the tube.

Another object of this invention is to provide a tube drawing device wherein the effective diameter of the die mechanism is varied by a cam and follower arrangement having a cam with a profile corresponding to a magnification of the desired tube profile so that the tube profile is very accurately controlled by the cam.

Another object of this invention is to provide a tube drawing mechanism which consists basically of several parts adapted for attachment to a conventional lathe which serves as the support and drive means of the mechanism, thereby greatly reducing the cost of the mechanism to owners of a suitable lathe.

A still further object of this invention is to provide a tube drawing mechanism wherein the tube is rolled or drawn on a mandrel and wherein provision is made for inserting the mandrel into either end of the tube to permit the production of double tapered tubes, the mechanism also including provision permitting the tube to move over the mandrel, when the mandrel is inserted from the tailstock end of the tube, to accommodate the extrusion of the tube as it is drawn.

A still further object of this invention is to provide means in a tube drawing mechanism of the above character for controlling the wall thickness of the tube at any particular point along its length in relation to the diameter at that point so that the wall thickness is made to vary with the diameter.

Other objects and advantages will be clear from the drawings and from the description which follows.

The drawings show the preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Figure 1:
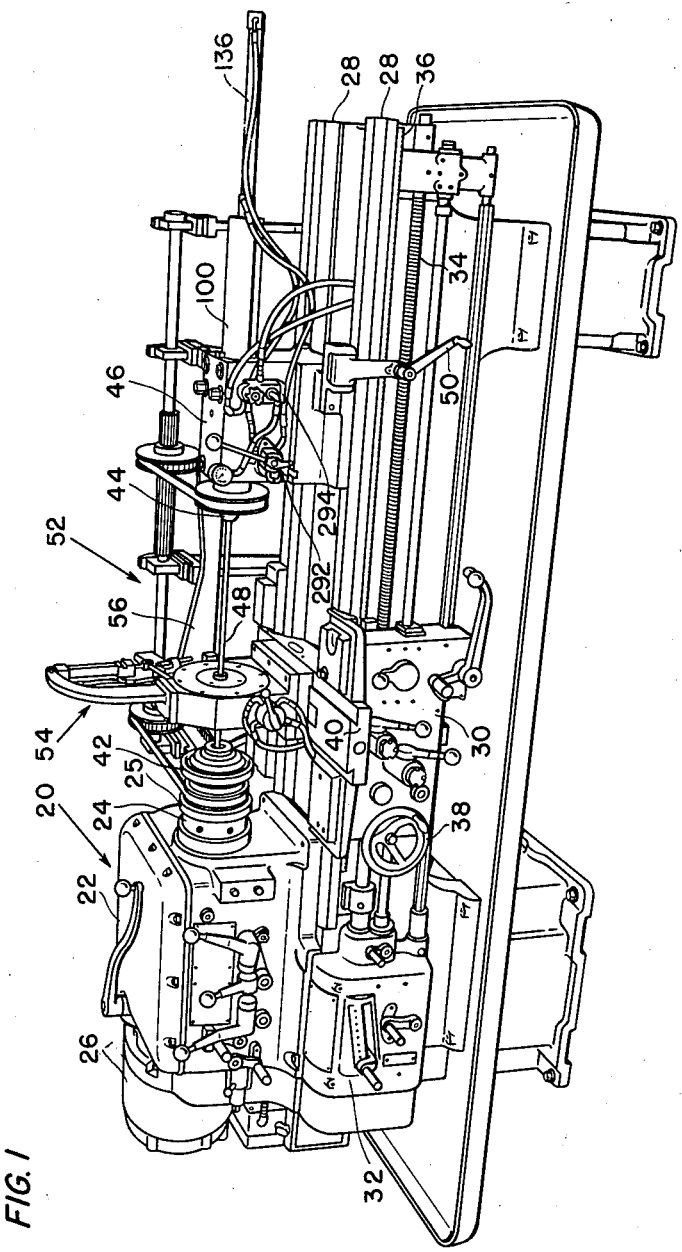
Figure 10:
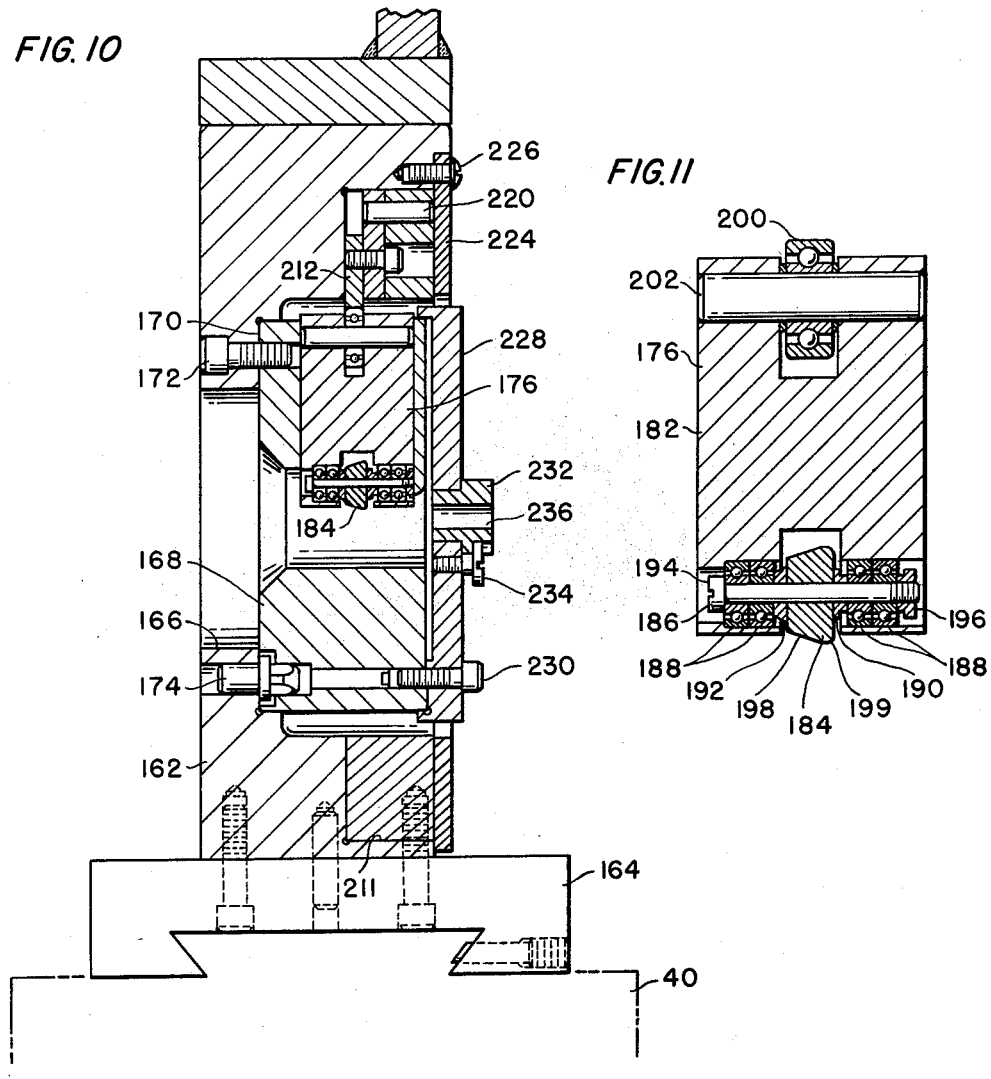
Figure 12:
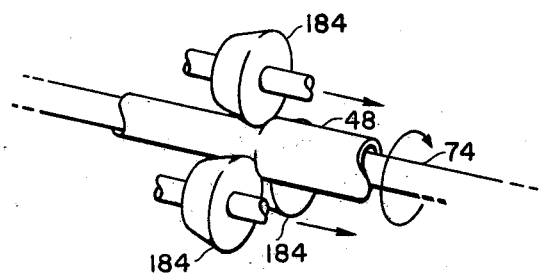
Figure 13:
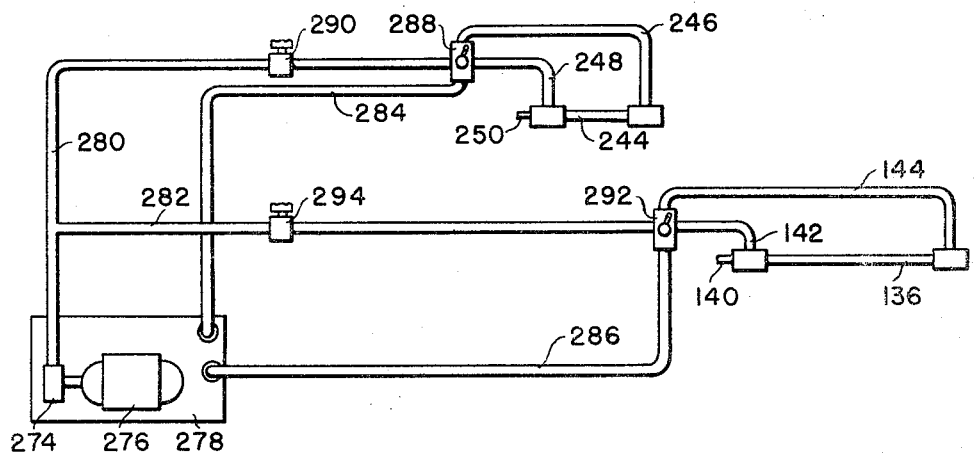
Figure 14:
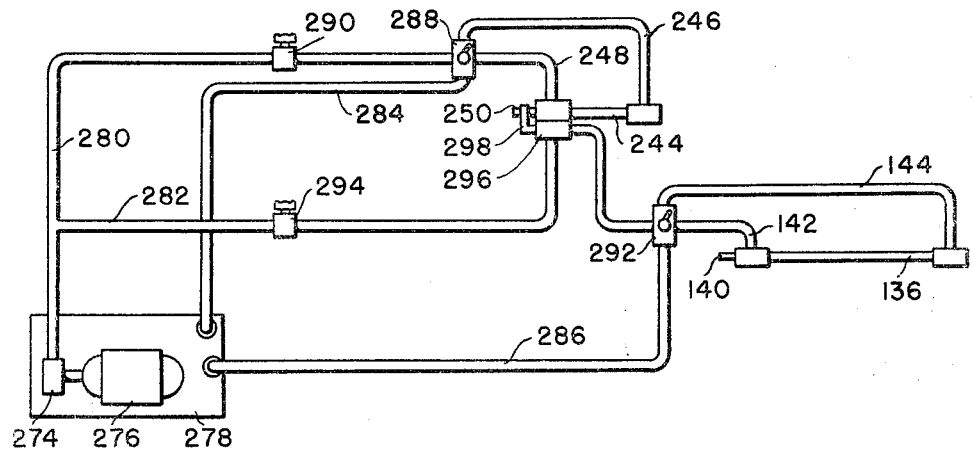

Of the drawings:

FIG. 1 is a perspective view of a tube drawing machine embodying the present invention, FIG. 2 is a partial top view of the tube drawing machine shown in FIG. 1, but with some parts being omitted and other parts being broken away for clarity, FIG. 3 is a view, partly in elevation and partly in section, showing the headstock chuck and its associated structure used in the tube drawing machine of FIGS. 1 and 2, with the view being drawn on a scale enlarged from that of FIG. 2, FIG. 4 is an enlarged fragmentary sectional view taken on the line 4—4 of FIG. 3, FIG. 5 is an enlarged fragmentary sectional view taken on the line 5—5 of FIG. 3, FIG. 6 is a view, partly in elevation and partly in section, showing the tailstock chuck and its associated structure used in the tube drawing machine of FIGS. 1 and 2, with the view being drawn on a scale enlarged from that of FIG. 2, FIG. 7 is a sectional view taken on the line 7—7 of FIG. 6, FIG. 8 is an end elevational view of the die mechanism used in the tube drawing mechanism of FIGS. 1 and 2, with the view being drawn on a scale enlarged from that of FIG. 2, FIG. 9 is an enlarged fragmentary view of the die mechanism shown in FIG. 8 with some of the parts being broken away to reveal the structure of other parts, FIG. 10 is a vertical sectional view of the die mechanism taken on the line 10—10 of FIG. 9, FIG. 11 is an enlarged sectional view of a slide assembly employed in the die mechanism of FIGS. 9 and 10, FIG. 12 is a somewhat schematic perspective view showing the cooperation between the rollers of the die mechanism, the tube, and the mandrel in the operation of the tube drawing machine of FIGS. 1 and 2, FIG. 13 is a schematic piping diagram of the hydraulic system employed in the tube drawing machine of FIGS. 1 and 2, and, FIG. 14 is a schematic piping diagram of an hydraulic system employed in a tube drawing machine comprising another embodiment of this invention.

*General organization*

Before describing in detail the structure of the various parts comprising the tube drawing mechanism illustrated by the drawings, its general organization and operation will be discussed.

Preferably, the tube drawing machine comprises a number of parts adapted for attachment to a conventional lathe which serves as the support and drive means of the machine, and in the drawings and in the description which follows, the machine will be considered to be one so adapted for use with a lathe. It will be understood, however, that the machine could, if desired, be provided with its own special support structure and drive means.

Referring to FIG. 1, the illustrated tube drawing machine is shown to comprise a plurality of parts attached to a lathe, which is indicated generally by the reference numeral 20 and which is of a generally conventional construction. The lathe 20 includes a headstock 22 having a spindle 24 to which is attached a dogplate 25. The spindle extends into the headstock 22 and is driven by various gear or other drive arrangements in the headstock from a motor 26. To the right of the headstock are two parallel and horizontal ways 28, 28 which slidably support a carriage 30 for movement longitudinally thereof. The headstock 22 also includes a drive arrangement for driving a change gear mechanism 32 which serves to rotate a lead screw 34 at various selected speeds. The lead screw 34 is located below and parallel to the ways 28, 28 and is selectively engageable with the carriage 30 to drive the carriage in either direction along the ways 28, 28. Above the lead screw 34 is an elongated rack 36. A pinion on the carriage 30 is engageable with the rack 36 and operable by the handwheel 38 to permit the carriage 30 to be moved along the ways by manual operation of the handwheel. The carriage 30 also includes a transverse slide portion 40 which has a dovetail cross section. The slide portion 40 normally serves to support the cross slide of the lathe 20, but in the present instance the cross slide is removed from the lathe in order to adapt the lathe to the purpose of the present machine.

The parts attached to the lathe 20 for the purpose of drawing a tube include a first chuck 42 attached to the headstock spindle 24 and a second chuck 44 attached to a special tailstock assembly 46. The two chucks 42 and 44 serve respectively to engage and support the opposite ends of a length of tube 48 for rotation about its longitudinal axis. As will later be brought out in more detail, the tube 48 as it is drawn has a mandrel inserted in its bore, and the parts associated with the chucks 42 and 44 are adapted to also support the mandrel for rotation with the tube 48. The tailstock assembly 46 is slidably mounted on the ways 28, 28 for movement therealong and includes a crank 50 having a pinion which meshes with the rack 36 so that the tailstock may be moved along the ways by a manual operation of the crank.

As mentioned previously, the headstock chuck 42 is driven directly by drive arrangements in the headstock 22 from the motor 26. In addition to this, the machine includes means for simultaneously driving the tailstock chuck 44 in synchronism with the headstock chuck so that both ends of the tube 48 have a driving effort imparted thereto. The drive mechanism for the tailstock chuck is indicated generally at 52 in FIG. 1, and will be described in more detail below.

The means for drawing the tube 48 to reduce its diameter comprises a die mechanism, indicated generally at 54, which is mounted on the portion 40 of the carriage 30 so as to be movable longitudinally of the ways 28, 28, and of the tube 48, as a result of the longitudinal movement of the carriage. As brought out in more detail below, the die mechanism 54 includes a plurality of die elements, preferably rollers, which are arranged in an annular series about the axis of the tube 48 and are collectively movable radially of the tube to vary the diameter of the tube produced thereby. The radial positions of the rollers in the die mechanism are controlled by an elongated cam 56 positioned in spaced parallel relationship with the tube 48. A follower on the die mechanism 54 travels along the cam 56 and adjusts the radial positions of the die elements or rollers in accordance with variations in the profile of the cam. Preferably, the profile of the cam corresponds to a magnification of the desired tube profile, in which case the die mechanism is operable to move the rollers radially in response to the cammed movement of the follower and by amounts reduced from, but directly proportional to the cammed movements of the follower. The machine illustrated in the drawings is primarily intended for the production of either singly or doubly tapered tubes. However, various other tube profiles may be readily produced by the machine by using differently shaped cams and corresponding mandrels. The particular cam 56 shown in FIG. 1 is used in the production of a doubly tapered tube. As the tube 48 is rotated by the chucks 42 and 44 the die mechanism 54 is moved longitudinally of the tube by the lead screw 34, and as the die mechanism so moves, the rollers thereof are adjusted radially in accordance with the dictates of the cam 56 to produce the desired tube profile. At the same time, the rollers of the die mechanism cooperate with the mandrel inside the tube to control the wall thickness of the tube. As brought out below, the tailstock chuck further serves to exert a pull on the associated end of the tube 48 to place the tube in tension as it is drawn, and this also has an important effect in controlling the wall thickness of the tube.

*Headstock chuck assembly*

Reference is now made to FIGS. 2 and 3 for a detailed description of the headstock chuck 42 and its associated parts. The chuck 42 includes a collet 58 through which the tube 48 normally extends, and the chuck is operable in a conventional manner to compress the collet into tight frictional engagement with the outside surface of the tube so that the tube will be supported and driven by the chuck. As viewed in FIG. 3, the chuck 42 has a pulley 60 fixedly secured to its left-hand face so that the chuck and the pulley comprise a unitary structure. This structure is attached to the dogplate 25 on the spindle 24 by a plurality of bolts, one of which is shown at 62, so that the pulley and chuck will be rotated by the spindle. To the left of the chuck 42 and the pulley 60 is a drawbar 64 which extends through the lathe spindle 24, the spindle being hollow and extending through the headstock 22. Although the lathe spindle is not shown in FIG. 3, it is to be understood that the shoulder 66 on the right-hand end of the drawbar 64 abuts against a corresponding shoulder on the right-hand end of the spindle 24. The left-hand end of the drawbar 64 threadably receives a housing 68 having a shoulder 70 which is engageable with another shoulder on the left-hand end of the spindle 24. The housing 68 is threaded onto the drawbar 64 to bring the shoulders 66 and 70 into firm engagement with the corresponding shoulders of the spindle so that the drawbar 64 is tensioned and held securely in place in the spindle.

The drawbar 64 is tubular and serves to receive a portion of the tube 48 that extends to the left of the chuck 42. Inside the portion of the tube located in the drawbar 64 is a shaft 72 which serves to support a mandrel 74 used in association with that part of the tube which is to be drawn. Referring to FIG. 5, it will be noted that the shaft 72 is threadably connected with the mandrel 74 at a location near the chuck 42. Although the mandrel and the shaft may be made as a single unit, it is preferable that the two parts be separable since a number of mandrels may be needed in the production of a given tapered tube, and therefore the shaft may be used with any one of the mandrels. Furthermore, in the case of producing a doubly tapered tube it is necessary during part of the drawing process to insert a mandrel from the tailstock end of the tube and to omit the mandrel at the headstock end. In this case, however, it would still be desirable to use the shaft 72 to properly locate the tube in the machine, as described below. As shown in FIG. 4, the left-hand end of the tube 48 is connected with the shaft 72 by a pin clip 76 having a pin 78 which extends through openings in the shaft 72 and the walls of the tube 48 so that the tube is axially and angularly fixed to the shaft and will rotate therewith.

The housing 68 extends beyond the left-hand end of the spindle 24 and has a handwheel 80 threadably connected therewith, as shown in FIG. 3. The shaft 72 extends through the housing 68 and at the location of the handwheel 80 has a threaded portion 82 which receives a flanged bushing 84. The flange of the bushing 84 is held against an abutment on the left-hand face of the housing 68 by two clamping fingers 86, 86 which are spring-biased outwardly from the bushing and engageable with the tapered surface 88 of the handwheel 80. The surface 88 normally holds the clamping fingers 86, 86 in securing relationship with the bushing 84; however, by threading the handwheel to the left with respect to the housing 68 the clamping fingers will be moved to release the bushing from the housing 68 to permit the removal of the shaft 72, the tube 48 and the mandrel 74 as a unit. Preferably, the shaft 72 extends some distance beyond the handwheel 80 and has a knocker 90 slidably mounted thereon to permit the same to be struck against a nut 92 on the end of the shaft. After the tube 48 is drawn by a pass of the die mechanism 54, as hereinafter described, the shaft 72, the tube 48 and the mandrel 74 are removed as a unit from the machine and the pin clip 76 is removed from the tube 48. The tube may then be grasped in the hand and the knocker 90 used to extract the shaft 72 and the mandrel 74 from the tube in cases where the tube may be tight on the mandrel 74.

The use of the knocker 90 is also of benefit in cases where a doubly tapered tube is being produced and where the mandrel is inserted from the tailstock end of the tube rather than from the headstock end for the purpose of drawing the second part of the taper. In such a case, the tube is likely to be pressed tightly against the mandrel as a result of the drawing process, and when the tube is later taken from the machine the tube 48 and shaft 72 may be withdrawn as a unit from the headstock while the mandrel remains fixed to the tailstock assembly 46. Hence, it may be necessary to jar the tube loose from the mandrel, by striking the knocker against the nut 92, before the tube and shaft are removed.

It should also be noted that the shaft 72 further serves to locate the tube 48 longitudinally with respect to the various parts of the drawing machine, and particularly with respect to the cam 56. The longitudinal position of the tube 48 and of the shaft 72 is adjustable by threading the bushing 84 along the threaded portion 82 of the shaft. Once the bushing 84 is set to a given position on the threaded portion 82, however, the tube 48 may be taken from the machine and later replaced, and the shaft and bushing in cooperation with the housing 68 will assure the return of the tube to its exact former position in the machine. This feature is of particular importance since, as brought out below, it is generally necessary to form the tube by making several passes with the die mechanism, during each of which the tube is reduced to a different minimum extent, and by taking the tube from the machine and annealing it between successive passes.

The chuck and drawbar assembly shown in FIG. 3 is primarily adapted for use in the production of tubes wherein a substantially straight portion precedes the tapered portion, and in this situation the tubular drawbar 64 is used to accommodate the straight portion of the tube while the tapered portion is being formed by the die mechanism. Of course, it is to be understood that if the tube to be drawn includes only a relatively short straight portion preceding a tapered portion, it may not be necessary to provide a drawbar and other structure associated therewith. A chuck alone may be adequate in this case.

Tailstock assembly

Referring now to FIGS. 6 and 7 for a detailed description of the tailstock assembly 46, this assembly is shown to include a housing 94 mounted on a base 96. The base 96 is in turn slidably supported on the ways 28, 28 of the lathe 20, as previously described. The housing 94 is provided with a bore 98 which extends longitudinally with respect to the axis of the tube 48 and slidably receives a generally tubular support member 100. The tailstock chuck 44 is secured to a spindle 45 rotatably supported on the left-hand end of the support member 100 by two ball bearing units 102, 102, as shown in FIG. 6. The spindle 45 also has secured thereto a toothed pulley 104. The right-hand portion of the support member 100 is provided with an upper slot 106 and a lower slot 108, both of which slots extend for some distance along the length of the support member and radially through the walls thereof, as shown in FIG. 7. Keys 110 and 111 fastened to the left-hand end face of the housing 94 extend respectively into the slots 106 and 108 to restrain the member 100 against angular movement with respect to the housing 94. At its right-hand end the housing 94 has connected thereto a mandrel mounting member 112. This member includes a tubular portion 114 located in the bore of the member 100 and two wing portions 116 and 118. The upper wing portion 116 extends through the upper slot 106 in the member 100 and is fixedly secured to the housing 94 by a bolt 120 while the lower wing portion 118 extends through the lower slot 108 in the member 100 and is fixedly secured to the housing 94 by another bolt 122. The wing members 116 and 118 assist the keys 110 and 111 in restraining the support member 100 against angular movement with respect to the housing 94, but together with the keys permit the member 100 to slide relative to the housing 94 while the mounting member 112 remains fixed to the housing. At the left-hand end of the mounting member 112 is a spindle 124 having a bore 126 for receiving the right-hand end portion of a mandrel 128 inserted into the tailstock end of the tube 48. The mandrel is secured to the spindle 124 by means of a pin 130 which is passed through corresponding openings in the spindle and the mandrel, and the spindle is rotatably supported on the mounting member 112 by two ball bearing units 132 and 134.

The longitudinal movability of the tailstock chuck 44 provided by the slidable support member 100 serves to accommodate lengthening of the tube 48 which occurs as a result of the drawing operation performed by the die mechanism 54. The chuck 44 is adapted to securely grasp the tailstock end of the tube 48 and as the tube is lengthened the tube and the chuck move to the right and over the mandrel 128, provided the mandrel is employed at the time.

Furthermore, instead of merely permitting the tube and chuck to move to the right as the tube is lengthened, it has been found desirable to actually pull the tailstock end of the tube to the right so as to place the tube in tension as it is drawn. For example, it has been found that imparting a constant tension force to the tube as it is drawn by the cooperation of the die mechanism and mandrel provided in this machine will result in a relatively uniform wall thickness throughout the length of the tube. On the other hand, it has also been found that varying the tension force on the tube as it is drawn will cause the wall thickness of the tube to be varied in accordance with the tension force. It should be noted, however, that in all cases the tension force applied to the tube should be one resulting in unit stresses below the elastic limit of the tube material so that no inelastic deformation of the tube occurs as the result of the tension force acting by itself. The thickness is controlled by the tension force working in cooperation with the die mechanism and the mandrel.

In the present instance, a tension or pulling force is exerted on the tube 48 by means of an hydraulic cylinder 136, as shown in FIG. 6. The rod end of the cylinder body is secured to a plate 138 carried by the right-hand end of the support member 100, while the piston rod 140 extends through an opening in the plate 138 and is threadably connected with the mounting member 112. Pressure fluid is supplied to and exhausted from the cylinder 136 by a pair of hydraulic lines 142 and 144. From FIG. 6, it will be obvious that operation of the cylinder 136 in such a manner as to cause extension of the piston rod 140 will result in movement of the supporting member 100 and the chuck 44 to the right, and that operation of the cylinder in such a manner as to retract the piston rod 140 will cause movement of the member 100 and the chuck 44 to the left. Of course, when the chuck 44 is in gripping engagement with a tube 48, the application of pressure fluid to the cylinder 136 in such a manner as to tend to extend the piston rod 140 will impart a tension force on the tube, and this force will be directly related to the pressure of the fluid supplied to the cylinder.

Tailstock drive mechanism

As mentioned previously, the tailstock chuck 44 is driven in synchronism with the headstock chuck 42 so that driving effort is simultaneously imparted to both ends of the tube 48. Because of this, driving torque is imposed on both ends of the tube segment which is in engagement with the die mechanism, and the portion of the tube on either side of the die mechanism will carry only a fraction of the total torque required to rotate the said tube segment relative to the die mechanism. Thus, the danger of the driving torque exceeding the elastic limit of the tube material and causing a twist deformation is greatly reduced in the present machine.

The means for driving the tailstock chuck provides a positive mechanical connection between the headstock chuck 42 and the tailstock chuck 44 so that the latter chuck is driven from the former and at the same angular velocity. As seen best in FIG. 2, the drive means, indicated generally at 52, comprises a drive shaft 146 which is rotatably supported by a plurality of bearing units 148, 148, in spaced parallel relationship with the tube 48.

The bearing units 148, 148 are in turn supported from the rear side of the lathe bed by a corresponding number of brackets 150, 150, as shown in FIG. 2. Fixedly secured to the drive shaft 146 is a first pulley 152 which is aligned with the pulley 60 on the headstock chuck 42. Both of the pulleys 60 and 152 are toothed and have trained therearound a toothed belt 154 which serves to positively transmit power from the pulley 60 to the pulley 152 to rotate the shaft 146. Also fixedly secured to the drive shaft 146 is a spline 156 having a toothed pulley 158 mounted thereon, the pulley 158 being movable longitudinally of the spline but being fixed by the same against relative angular movement with respect to the shaft 146. Preferably, the spline 156 includes a recirculating ball system, similar to that of a ball bearing screw, which cooperates with the pulley 158 to permit the latter to move freely longitudinally of the spline. In the absence of the recirculating ball system the pulley 156 may not be free enough on the spline 158 to be moved properly by the belt 160, in which case it may be desirable to positively move the pulley 158 by an arm (not shown) fixed to the tubular member 100 and engageable with the pulley. The pulley 158 is aligned with the toothed pulley 104 on the tailstock chuck 44 and power is transmitted therebetween by a toothed belt 160 to cause rotation of the chuck 44. The belt 160 also acts to move the pulley 158 along the spline 156 in accordance with the longitudinal movement of the tailstock chuck 44 and the pulley 104 so that power is transmitted between the wo pulleys for all positions of the tailstock chuck.

*The die mechanism*

As mentioned previously, the die mechanism 54 is mounted on the lathe carriage 30 and is movable therewith longitudinally of the tube 48 and, during such longitudinal movement, is engageable with the tube so as to reduce the diameter of the same by varying amounts at different positions along its length to provide a desired tube profile. The die mechanism acts in conjunction with a mandrel inside the tube and also in conjunction with the hydraulic cylinder 136 on the tailstock assembly 46 so as to not only produce the desired tube profile but also to maintain the wall thickness of the tube within desired limits.

For a detailed description of the die mechanism 54, reference is made to FIGS. 8, 9, 10 and 11. From these figures, it will be noted that the die mechanism includes a housing 162 which is securely mounted on a base member 164. As shown best in FIG. 10, the base member 164 is in turn fastened to the slide portion 40 of the lathe carriage 30. The housing 162 is provided with a central bore 166 which receives a slide plate 168. The slide plate 168 abuts axially against a shoulder 170 in the bore 166 and is fastened securely to the housing 162 by a plurality of screws, one of which is shown at 172. The member shown at 174 in FIG. 10 is a piloting stud which is press-fitted into the housing 162 and serves to correctly locate the slide plate 168 relative to the housing during the assembly of these two parts.

As shown best in FIG. 9, the slide plate 168 serves to slidably support three slide assemblies 176, 176 which are received in corresponding radial grooves 178, 178 formed in the face of the slide plate 168. At the intersection of the grooves 178, 178 is a central opening 180 through which the tube 48 normally passes. Thus, the slide assemblies 176, 176 are radially movable with respect to the tube axis and are arranged in an angularly spaced relationship thereabout.

Referring to FIG. 11, each of the slide assemblies 176, 176 includes a slide block 182 having a roller 184 rotatably mounted on its radially inner end and which roller is engageable with the outer surface of the tube 48 for the purpose of reducing its diameter. The roller 184 is secured to the slide block 182 by means of a shaft 186 rotatably supported by four ball bearing units 188, 188, there being two ball bearing units on either side of the roller 184. As viewed in FIG. 11, a spacer 190 is positioned on the shaft between the roller 184 and the two right-hand ball bearing units 188, 188, and another spacer 192 is positioned on the shaft 186 between the two left-hand ball bearing units 188, 188. The shaft 186 is preferably in the form of a bolt having a head 194 on one end and a nut 196 threadably secured to its other end. The roller 184 may take various shapes, but preferably, as shown in FIG. 11, it is formed with a trailing conical surface 198 and a rounded leading surface 199 which is the surface that actually engages the tube during the drawing process. On its upper or radially outer end the slide block 182 is provided with another roller in the form of a ball bearing unit 200, the inner race of which is secured to a shaft 202 press-fitted into the slide block 182, as shown.

As shown schematically in FIG. 12, the three rollers or die elements 184, 184 act collectively or in unison and simultaneously engage the outer surface of the tube so that the tube is supported by and squeezed between the rollers during the drawing process with the result that the tube is pressed against the outer surface of the mandrel. The forces exerted by the rollers on the tube are relatively large, and in fact, it is preferred that the radial positions of the rollers be so adjusted during the drawing process that they would have an interference fit with the mandrel inside the tube if the tube were removed from the mandrel. Of course, the tube diameter produced by the rollers 184, 184 will depend on their respective radial positions with respect to the axis of the tube, and these radial positions are adjusted in conformity with the profile of the mandrel so that the rollers will press the tube against the mandrel throughout the length of travel of the die mechanism.

As will be seen in FIG. 9, each of the slide blocks 182, 182 is provided with a recess on each of its side walls, and the slide plate 168 is provided with corresponding recesses. Springs 204, 204 are located in these recesses at either side of the slide block and serve to bias the assembly 176 radially outwardly with respect to the slide plate 168. Each of the slide assemblies is retained in its groove in the slide plate by a cover 206 which is secured to the slide plate by a plurality of bolts 208, 208.

The die mechanism 54 also includes means for collectively moving the slide assemblies 176, 176 radially inwardly or radially outwardly to adjust the radial positions of the several rollers 184, 184 and thereby vary the diameter of the tube as it is drawn. This means comprises a cam supporting member or ring 210 which surrounds the slide plate 168 and is received in an enlarged portion 211 of the housing bore 166 for relative angular sliding movement with respect to the housing 162. The ring 210 has, as shown in FIG. 9, three cam elements 212, 212 attached thereto, and each of the cam elements has a radially inwardly facing cam surface 214 which engages a respective one of the ball bearing units or rollers 200 on the outer end of the slide assemblies. The three surfaces 214, 214 are all of a similar shape and are somewhat eccentric with respect to the central axis of the die mechanism. Referring to FIG. 9, it will be seen that the cam surfaces 214, 214 are so shaped and arranged that they will function to move the slide assemblies 176, 176 radially inwardly toward the central axis of the tube or die mechanism when the supporting member or ring 210 is moved in a clockwise direction with respect to the housing 162. Similarly, the slide assemblies 176, 176 will be moved radially outwardly by the action of the springs 204, 204 when the support member or ring 210 is moved in a counterclockwise direction with respect to the housing 162. Since the cam surfaces 214, 214 are all of a similar shape, each of the slide assemblies 176, 176 will be moved an equal distance for any given relative movement of the support member or ring 210.

Movement of the support member or ring 210 relative to the housing 162 is effected by a follower arm 216 which extends outwardly from the die mechanism 54 in a generally horizontal direction and in a plane perpendicular to the tube axis. The inner end of the follower arm 216 is fixedly secured to the support member or ring 210 by a number of screws 218, 218, by a locating pin 220 and by two keys 222, 222 which fit in corresponding slots formed in the follower arm 216 and the ring 210, as shown in FIG. 9. As shown in FIG. 10, the support member or ring 210 and the attached follower arm 216 are retained in place with respect to the housing 162 by an annular cover 224 which is attached along its outer margin to the housing 162 by a number of screws 226, 226. The right-hand face of the slide plate 168 is also provided with an annular cover 228 which is attached thereto by a number of screws, one of which is shown at 230. The central opening of the slide plate cover 228 receives a bushing 232 which is detachably secured to the cover by a screw 234 having a wide head that engages a shoulder formed on part of the outer periphery of the bushing 232. The bore 236 of the bushing is suited to the diameter of the tube rolled or drawn by the die mechanism, it being understood that the particular bushing 232 shown in FIG. 10 may be replaced with other bushings of differently sized bores to accommodate tubes of different sizes.

To control the movement of the slide assemblies 176, 176 in such a manner as to produce the desired tube profile as the die mechanism is moved longitudinally of the tube 48, the follower arm 216 is associated with the cam 56 so that the cam will move the follower arm in a generally up and down direction and angularly with respect to the die mechanism housing 162 to automatically achieve the proper positioning of the slide assemblies. Referring to FIG. 8, it will be noted that the cam 56 is positioned in spaced parallel relationship with the tube axis and has an elongated upwardly facing cam surface 238. The follower arm 216 extends outwardly from the die mechanism 54 into vertically spaced relationship with the cam surface 238 and carries a follower in the form of a roll 240. The follower roll 240 travels over the cam surface 238 as the die mechanism is moved longitudinally of the tube 48 and adjusts the follower arm 216 upwardly and downwardly in response to variations in the height of the cam surface 238. This adjusting movement of the follower arm 216 will in turn cause angular movement of the ring 210 and the cams 212, 212, and result in corresponding collective radial movement of the slide assemblies to vary the diameter of tube produced by the roller die elements 184, 184.

At this point, it should be noted that the relationship of the follower arm, the support ring 210 and the cams 212, 212 is such that the radial movement of the slide assemblies 176, 176 is proportional to the cammed displacement of the outer end of the follower arm but is substantially less than such cammed displacement. That is, the cams 212, 212 are identical uniform motion cams so that a given angular displacement of the ring 210 will cause a proportionate movement of the slide assemblies 182, 182 in unison and to the same extents, the cams 212 212 serving to reduce the magnification of the cam 56 down to the desired tube profile ahd also serving to provide a mechanical advantage. In other words, a relatively large vertical movement of the outer end of the follower arm 216 will produce only a small radial, but proportionate, displacement of the slide assemblies 176, 176, the profile of the cam surface 238 therefore being in effect a magnification of the resulting tube profile produced by the cam 56. The profile of the cams 212, 212 will depend on the length of the follower arm 216, the size of the supporting ring 210, and on the desired magnification of the cam 56, and does not change with a change in the desired configuration of the tube 48, be it a uniform or nonuniform taper. In the illustrated machine the magnification is on the order of twenty, so that a one inch change in the height of the cam surface 238 results in a change of fifty thousandths of an inch in the positions of the slide assemblies 176, 176. Because of this multiplication factor the cam obviously exerts a very accurate control over the tube profile.

In addition to the above, the die mechanism 54 is also provided with means for yieldably urging the follower arm 216 downwardly so as to bring the follower roll 240 into engagement with the cam surface 238 and yet permit the follower arm to rise and fall in accordance with the variations in the height of the cam surface. As shown in FIG. 8, this means includes a bracket 242 fixedly secured to the upper portion of the housing 162 and extending upwardly and outwardly into spaced vertical relationship with the follower arm 216. Operatively connected between the outer end portion of the bracket 242 and the follower arm 216 is an hydraulic cylinder 244. Pressure fluid is supplied to and exhausted from the cylinder 244 by the conduits 246 and 248. When pressure fluid is supplied to the cylinder 244 in such a manner as to tend to extend its piston rod 250, the cylinder will exert a force between the bracket and the follower arm tending to urge the follower arm downwardly to bring the follower roll 240 into engagement with the cam surface 238. The force exerted will, of course, depend on the pressure of the fluid supplied ot the cylinder 244 and, as will later be described, this pressure may be regulated to vary the downward force on the follower arm.

Referring again to FIG. 8, it will also be noted that the follower roll 240 is connected with the follower arm 216 so as to be vertically adjustable with respect thereto. Such vertical adjustment of the follower roll changes the height of the follower arm with respect to the cam surface and as a result changes the radial positions of the slide elements 176, 176 and of the rollers 184, 184 by a constant amount along the entire length of the cam surface 238. That is, by means of this adjustment the rollers 184, 184 of the die mechanism may be adjusted to produce the desired tube diameter at a given point along the length of the tube and thereafter the cam surface 238 will act to properly adjust the rollers to produce the desired tube diameter at other points along the length of the tube. In other words, the adjustment of the follower roll 240 is an adjustment which is made at an initial point in the tube drawing process to bring the follower arm 216 into proper relationship with the cam 56. Once this proper relationship is achieved by this adjustment, no further adjustments need be made.

The adjustable mounting for the follower roll 240 includes two vertically arranged guide members 252, 252 which are mounted on the outer end of the follower arm 216 in a horizontally spaced relationship. Between the two guide members 252, 252 is a bar 254 which is slidable vertically with respect to the guide bars 252, 252 and on the lower end of which is mounted the roll 240. A plate 260 is secured to the upper ends of the guide bars 252, 252 and receives a threaded shaft 262 which is free to rotate relative to the plate 260 but is restrained against movement in a vertical direction. The lower end of the shaft 262 is threadably received in the slide bar 254 and its upper end is provided with a knob 264 which may be turned by hand to rotate the shaft 262. Rotation of the knob 264 in one direction or the other will thread the shaft 262 into or out of the slide bar 254 and move the same vertically with respect to the follower arm 216. Preferably, although not shown, the knob 264 and the plate 260 are provided with dial markings or lines to indicate the angular position of the knob with respect to the plate.

The die mechanism 54 is also provided with an adjustable stop means which functions to override the action of the cam 56 and thereby control the minimum tube diameter by preventing further angular movement of the follower arm 216 in a downward direction when the height of the cam surface 238 falls below a given desired value. Due to work hardening and other considerations it is usually possible to effect only a certain amount of tube reduction during a single pass of the die mechanism, and often the amount of reduction allowed is not sufficient to allow the tube to be completely formed in the one pass. In such a situation the die mechanism is operated to taper or otherwise reduce a first portion of the tube adjacent the headstock chuck 42 until the die mechanism reaches a point along the length of the tube at which the diameter approaches the allowable minimum value. Thereafter, the die mechanism is continued along the length of the tube, but by means of the adjustable stop, which is previously set to the minimum value, the roller die elements 184, 184 are maintained at fixed radial positions so as to produce a straight but reduced length of tube. After this, the tube is taken from the machine, annealed, and then placed back in the machine with a new mandrel 74 having a configuration conforming to the shape of the tube to be attained at the end of the next pass of the die mechanism. Then, after setting the stop to a new minimum value, a part or all of the straight portion of the tube produced in the preceding pass is tapered or otherwise formed in another pass of the die mechanism. To obtain tube profiles having at their narrowest points relatively large reductions in the tube diameter, it may be necessary to make as many as four or five passes with the die mechanism, with the tube being taken from the machine, annealed and provided with a different mandrel between successive passes.

Although the adjustable stop means referred to above may take various forms, it preferably, and as shown in the present instance, comprises a threaded stud 266 and an abutment block 268. The stud 266 is threadably received by a bushing 270 fixed to the follower arm 216 and the abutment block 268 is fixed to the housing 162. Engagement of the stud with the block determines the lowermost limit of travel of the follower arm, and by threading the stud 266 into or out of the bushing 270, this limit of travel may be varied. A locking nut 272 is received on the stud and is tightened against the bushing 270 to prevent movement of the stud after it is properly adjusted. In FIGS. 8 and 9 the parts are shown with the stud 266 in engagement with the abutment block 268 so as to prevent any further downward movement of the follower arm 216. It will be obvious, however, that the follower arm is free to be moved upwardly by the cam 56 to increase the diameter of the tube being drawn.

*Hydraulic circuit*

The hydraulic system employed for the control and operation of the cylinders 136 and 244 is shown schematically in FIG. 13. From this figure, it will be noted that the system includes a pump 274, driven by a motor 276, and a reservoir 278. The pump delivers fluid under pressure from the reservoir 278 to a supply line 280 associated with the die mechanism cylinder 244 and to a supply line 282 associated with the tailstock cylinder 136. Also associated with the die mechanism cylinder 244 is a return line 284 and a similar return line 286 is provided for the tailstock cylinder 136. The supply and return lines 280 and 284 for the die mechanism cylinder 244 communicate with the cylinder lines 246 and 248 through a directional valve 288. By operation of the directional valve the cylinder lines 246 and 248 may be alternately connected with the supply line 280 and with the return line 284 to cause extension or retraction of the piston rod 250. Generally, the valve 288 is operated to connect the line 246 with the supply line 280 and the line 244 with the exhaust line 284 during a working pass of the die mechanism 54. This will cause the admission of pressure fluid to the base end of the cylinder 244 and tend to extend the piston rod so as to urge the follower arm 216 downwardly toward the cam 56. On the other hand, when the die mechanism is retracted at the end of a given pass, the valve 288 is generally operated to connect the line 284 to the supply line 280 and the line 286 to the exhaust line 285 so that the piston rod 250 will be retracted and the follower arm lifted from the cam to permit easier movement of the die mechanism. The supply line 280 also includes a pressure reducing valve 290 by means of which the force exerted by the cylinder 244 may be varied. As shown in FIG. 1, the directional valve 288 may be conveniently located on the die mechanism 54.

The circuit for the tailstock cylinder 136 also includes a directional valve 292 to which the supply line 282, the exhaust line 286 and the two cylinder lines 142 and 144 are connected. The valve 292 is selectively operable to alternately place the lines 142 and 144 in communication with the supply line 282 and the exhaust line 286. During the drawing process, the valve 292 is operated to place the line 144 in communication with the supply line 282 and the line 142 in communication with the exhaust line 286 so as to apply pressure to the base end of the cylinder 136 tending to cause extension of the piston rod 140, with the result that a tension force is placed on the slidable supporting member 100 and on the tube 48. The supply line 282 includes a pressure reducing valve 294 by means of which the pressure supplied to the cylinder 136 may be varied to control the force exerted on the tube by the cylinder. After the tube 48 is drawn and removed from the machine, the valve 292 may be operated to retract the piston rod 140 and cause the tailstock chuck 44 to be moved to the left to receive a new tube. As shown in FIG. 1, the directional valve 292 and the pressure reducing valve 294 may be conveniently located on the tailstock assembly.

The hydraulic system shown by FIG. 13 is primarily adapted to produce tubes having a uniform wall thickness throughout their length. As mentioned previously, it has been found that a uniform wall thickness will be obtained by exerting a constant tension force on the tube 48 while it is drawn by the die mechanism 54. With the system of FIG. 13, the constant force applied to the tube 48 is obtained by adjusting the pressure reducing valve 294, which when set will maintain the force at the desired constant value.

Instead of a uniform wall thickness, it may at times be desirable to form a tube having a wall thickness which varies along its length. This may be done with the present machine by varying the tension force on the tube 48 during the drawing process. Increasing the tension force decreases the wall thickness, while decreasing the tension force increases the wall thickness. One hydraulic system comprising a modification of this invention and utilizing this principle to vary the wall thickness of the tube is shown in FIG. 14. The system of FIG. 14 is similar to that of FIG. 13 except for the inclusion of another pressure reducing valve 296 in the supply line 282 of the tailstock cylinder 136. The pressure reducing valve 296 is adapted to change the pressure supplied to the cylinder 136 as the die mechanism 54 moves longitudinally of the tube and includes an operating arm 298 which is movable with respect to the valve body to control the output pressure.

It is contemplated that the operating arm 298 of the valve 296 may be operated in various manners to vary pressure supplied to the tailstock cylinder. For example, the movement of the arm could be controlled by a separate cam placed parallel to the cam 56. In the present instance, however, the valve 296 is shown to be mounted to the body of the cylinder 244 with its operating arm 298 fixed to the piston rod 250. Therefore, the output pressure of the valve is controlled in accordance with the movement of the piston rod 250 with respect to the body of the cylinder 244. This means the valve 296 will be controlled indirectly by the cam 56. As the piston rod 250 is extended to produce a smaller tube diameter the valve 296 is simultaneously operated to increase the pressure supplied to the cylinder 244 so that the wall thickness of the tube will be reduced at the same time. Likewise, when the piston rod 250 is retracted to increase the tube diameter, the valve 296 will be operated to decrease the pressure supplied to the cylinder 244 to increase the wall thickness of the tube. As a consequence, the resulting tube will have a wall thickness which varies in accordance with the diameter of the tube. Of course, as mentioned previously, if it is preferred that the wall thickness of the tube vary independently of the tube diameter, the operation of the pressure reducing valve 296 may be controlled by means independent of the cam 56.

*Operation*

Having now described the structural details of the tube drawing machine provided by this invention, its operation will be briefly summarized in connection with the production of a doubly tapered tube. A doubly tapered tube is one having a narrow portion or neck intermediate its ends and a tapered portion on either side of the neck.

A straight length of tube is installed in the machine by first inserting the shaft 72, with a mandrel 74, into the bore of the tube and connecting the two together by means of the pin clip 76. The tube, the shaft and the mandrel are then inserted through the drawbar 64 and through the die mechanism 54, and the handwheel 80 tightened on the housing 68 to clamp the bushing 84 to the housing and thereby properly locate the shaft, mandrel and tube in proper relationship with the various parts of the machine. The chucks 42 and 44 are then operated to grasp the associated ends of the tube, and the die mechanism is moved to the proper starting position adjacent the headstock chuck 42. At this time, or previous to this time, the pressure reducing valves 290 and 294 are set in accordance with the forces to be exerted by the cylinders 244 and 136. Similarly, the adjusting means for the follower roll 240 is set to bring the follower arm into proper relationship with the cam 56, and the stop stud 266 on the follower arm 216 is adjusted to the desired minimum tube diameter to be produced during the first pass of the die mechanism. The valve 288 is then operated to urge the follower arm downwardly toward the cam 56 and the valve 292 operated to tension the tube 48.

The actual drawing of the tube is then begun by starting the motor 26 to cause rotation of the chucks 42 and 44, which simultaneously impart driving effort to the tube for rotation about its longitudinal axis, and operating the carriage drive mechanism in such a manner as to cause the lead screw 34 to drive the carriage 30 toward the right or away from the headstock chuck 42. As the die mechanism moves along the tube 48 the die elements or rollers 184, 184 thereof engage the outer surface of the tube and press it with relatively large forces against the mandrel 74, and in this manner cause its diameter to be reduced. At the same time, the cylinder 136 on the tailstock assembly 46 exerts a tension force on the tube 48 which acts in conjunction with the rollers 184, 184 and the mandrel 74 to control the wall thickness of the tube. The amount by which the tube diameter is reduced is controlled by the profile of the cam 56 so that as the die mechanism moves along the first portion of the tube, the tube will be tapered or gradually narrowed as the die mechanism approaches the location of the neck. However, after the diameter is reduced to a certain critical value at which the material of the tube becomes work hardened to a given degree, the stud 266 on the follower arm 216 engages the abutment block 268 and prevents reduction of the tube below this diameter. The die mechanism 54 is then continued in its movement away from the headstock chuck 54 and reduces the tube to the minimum allowable diameter along another portion of its length. At the end of this first pass the drawn part of the tube will consist of a tapered portion followed by a straight portion reduced to the minimum allowable diameter.

After the first pass of the die mechanism the tube is removed from the machine and annealed to permit a further reduction in its diameter. The removal of the tube is accomplished by following a procedure which is the reverse of that used when inserting the tube. After annealing, the tube is again attached to the shaft 72, but a new mandrel is employed in conjunction with the shaft. It is intended in the operation of the machine that the die elements or rollers 184, 184 be at all times backed up by a mandrel in the bore of the tube and that the rollers actually squeeze the tube against the surface of the mandrel. Thus, since the tube shape is changed with each pass, each pass will require a different mandrel. After the tube, mandrel and shaft are attached to the machine, the die mechanism is again started from a position adjacent the headstock chuck 42 and moved in a direction away from the chuck. When the mechanism reaches the straight portion of the tube formed by the previous pass the rollers will operate to reduce that portion of the tube, first producing a taper which blends with the previously formed taper, and then, if necessary, producing another straight portion at the new minimum allowable diameter. In order to provide for the second taper which follows the neck portion, however, the straight portion produced in this pass is stopped short of the end of the straight portion formed in the first pass. This gives a stepped shape to the portion of the tube adjacent the tailstock chuck, which portion is later smoothed out to form the second taper.

Successive portions of the length of the tube are reduced in this manner by successive passes of the die mechanism, with the tube being annealed between each pass, until the tube is finally reduced to the point where the first taper is completed all the way up to the neck portion at which the second taper begins. If only a singly tapered tube were desired the operation would be complete at this time.

The second taper is now drawn by first removing the mandrel from the headstock end of the tube and inserting the mandrel 128 into its tailstock end. This is best accomplished by fastening the mandrel 128 to the spindle 124 in the tailstock assembly with the tube removed from the machine, and then positioning the tube in the machine by sliding it over the mandrel. After this, the chucks are operated to grip the tube and the motor started to rotate the same. The second tapered portion of the tube is then drawn in a single pass by moving the die mechanism from the neck portion toward the tailstock chuck 44. As mentioned, the tube prior to this drawing has a stepped shape following the neck due to the straight portions which are drawn in the preceding passes, and this last pass results in a smoothing out of the steps into the desired taper. At this point the tube is completed as far as the drawing process is concerned and is removed from the machine for further finishing operations.

The invention claimed is:

1. In a tube drawing mechanism the combination comprising, a mandrel adapted for insertion into the bore of a tube to be drawn and which mandrel has a nonuniform diameter profile, means for rotating the mandrel and the tube in unison about their common longitudinal axis, a die mechanism movable longitudinally of the tube and mandrel and which die mechanism includes a plurality of die elements arranged in angularly spaced relationship about the common longitudinal axis of said tube and mandrel, means including a cam having a profile related to that of said mandrel for collectively moving said die elements radially of said common longitudinal axis and in conformity with variations in the diameter of said mandrel as said die mechanism is moved longitudinally of the tube and mandrel, the movement of said die elements by said last-mentioned means being such that said die elements are brought into engagement with the outer surface of said tube and press the tube inwardly against the outer surface of said mandrel throughout the length of travel of said die mechanism.

2. The combination as defined in claim 1 further characterized by said means for collectively moving said die elements being operatively related to said mandrel in such a manner that said die elements in the absence of said tube on said mandrel are held in interferring relationship with the mandrel throughout the length of travel of the die mechanism.

3. In a tube drawing mechanism the combination comprising, a mandrel adapted for insertion into the bore of a tube to be drawn and which mandrel has an outer surface shaped generally similarly to the desired tube profile, means for rotating the mandrel and the tube in unison about their common longitudinal axis, a die mechanism movable longitudinally of said tube and mandrel and which die mechanism includes a plurality of die elements arranged in angularly spaced relationship about the common longitudinal axis of said tube and mandrel, the said die elements being engageable with the outer surface of said tube to reduce the diameter of the same when it is rotated and being collectively movable radially inwardly and radially outwardly with respect to the common axis of the tube and mandrel to vary the amount by which the tube diameter is reduced, a follower arm extending outwardly from said die mechanism and which follower arm is movable angularly with respect to said die mechanism in a plane perpendicular to said tube axis to cause collective radial movement of said die elements, generally downward movement of said follower arm causing collective radial inward movement of said die elements and generally upward movement of said follower arm causing collective radial outward movement of said die elements, a cam having an elongated and upwardly facing cam surface disposed generally parallel to the common axis of said tube and mandrel and having a profile corresponding to a magnification of the desired tube profile, a follower on said follower arm adapted to travel over said cam surface so as to move said follower arm angularly of said housing in response to variations in the profile of said cam surface when said housing is moved longitudinally of said tube and mandrel, yieldable means for urging said follower arm downwardly toward said cam surface so as to normally hold said follower in firm engagement therewith, and means for adjusting the height of said follower with respect to said follower arm so as to vary the height of said follower arm with respect to said cam surface with the result that the radial positions of said die elements corresponding to any point on said cam surface are changed by a constant amount, the last-mentioned means being adjustable to the point where said die elements have an interference fit with said mandrel throughout their travel longitudinally of said tube and mandrel.

4. The combination in a machine for drawing a length of tube of, a first chuck for engaging and supporting one end of said length of tube for rotation about its longitudinal axis and which first chuck is fixed against movement along said longitudinal tube axis, a die mechanism movable longitudinally of said length of tube and which mechanism is engageable with the outer surface of said length of tube to reduce the diameter and increase the length of the same upon relative rotational movement of said length of tube with respect thereto, a second chuck for engaging and supporting the other end of said length of tube for rotation about its longitudinal axis and which second chuck is movable along said tube axis to accommodate the lengthening of said length of tube which occurs as a result of the operation of said die mechanism, a mandrel adapted for insertion in the bore of said length of tube, and means associated with said second chuck for supporting said mandrel so as to extend through said second chuck and into the bore of said length of tube from said other end thereof and so as to be rotatable about and fixed against movement along said longitudinal tube axis so that said length of tube is extruded over said mandrel and said second chuck is moved along said mandrel as said tube is lengthened by the operation of said die mechanism.

5. The combination as defined in claim 4 further characterized by means for urging said second chuck in a direction away from said first chuck so as to exert a tension force on said tube.

6. In a tube drawing machine the combination comprising, a mandrel adapted for insertion into the bore of a tube to be drawn and which mandrel has a nonuniform diameter profile, first and second chucks spaced apart with respect to each other along a common axis and individually supported for rotation about said axis, the said chucks being adapted to drivingly engage and support respectively the opposite ends of a tube to be drawn, a die mechanism movable longitudinally of said common axis between said first and second chucks and which die mechanism includes a housing and a plurality of die elements supported in an angularly spaced relationship about said common axis, the said die elements being engageable with the outer surface of the tube to reduce the tube diameter and increase its length when the tube is rotated and being collectively movable radially of the tube to vary the amount by which the tube diameter is reduced, said second chuck being movable along said common axis and away from said first chuck to accommodate the lengthening of said tube which occurs as a result of the operation of said die mechanism, a cam follower on said die mechanism which follower is movable with respect to said die mechanism housing to cause collective radial movement of said die elements, a cam having a surface along which said follower travels as said die mechanism moves longitudinally of said common axis and which cam surface is so shaped and arranged that the resultant cammed movement of said follower causes such adjustment of said die elements as to produce a desired tube profile as said die mechanism is moved longitudinally of said common axis, said cam surface having a profile related to that of said mandrel, an hydraulic cylinder associated with said second chuck and operable to exert a force on said second chuck tending to move the same away from said first chuck so as to impart a tension force to the tube, and means for varying the force exerted by said hydraulic cylinder in response to the collective radial movement of said die elements and in such a manner that the force is increased as the die elements are moved radially inwardly and decreased as the die elements are moved radially outwardly with the result that a larger tension force is applied to the tube when a small tube diameter is being formed than is applied when a larger tube diameter is being formed.

7. The combination as defined in claim 6 further characterized by said means for varying the force exerted by said hydraulic cylinder comprising a conduit for supplying pressure fluid to said hydraulic cylinder, and a pressure regulator in said conduit which pressure regulator serves to control the pressure of the fluid supplied to said hydraulic cylinder in response to the movements of said follower with respect to said die mechanism housing.

8. In a tube drawing machine the combination comprising, first and second chucks spaced apart with respect to each other along a common horizontal axis and individually supported for rotation about said axis, the said chucks being adapted to drivingly engage and support respectively the opposite ends of a tube to be drawn, a die mechanism movable longitudinally of said common axis between said first and second chucks and which die mechanism includes a housing and a plurality of die elements supported in an angularly spaced relationship about said common axis, the said die elements being engageable with the outer surface of the tube to reduce the tube diameter and increase its length when the tube is rotated and being collectively movable radially of the tube to vary the amount by which the tube diameter is reduced, said second chuck being movable along said common axis and away from said first chuck to accommodate, the lengthening of said tube which occurs as a result of the operation of said die mechanism, a cam follower on said die mechanism which follower is movable in a vertical plane with respect to said die mechanism housing to cause collective radial movement of said die elements, a cam having an upwardly facing cam surface along which said follower travels as said die mechanism moves longitudinally of said common axis and which cam surface is so shaped and arranged that the resultant vertical movement of said follower causes such adjustment of said die elements as to produce a desired tube profile as said die mechanism is moved longitudinally of said common axis, a bracket fixedly secured to said die mechanism housing and having a portion located in vertically spaced relation with said cam follower, a first hydraulic cylinder connected between said bracket portion and said follower which cylinder includes a cylinder body and a piston rod and is operable to urge said follower against said cam surface, a second hydraulic cylinder associated with said second chuck and operable to exert a force on said second chuck tending to move the same away from said first chuck so as to impart a pulling force to the tube, a conduit for supplying pressure fluid to said second hydraulic cylinder, and a pressure regulator in said conduit and connected between the cylinder body and piston rod of said first hydraulic cylinder so as to control the pressure of the fluid supplied to said second hydraulic cylinder in response to the movements of said piston rod of said first cylinder with respect to its cylinder body.

9. The combination in a machine for drawing a length of tube of, a first chuck for engaging and supporting one end of said length of tube for rotation about its longitudinal axis and which first chuck is fixed against movement along said longitudinal tube axis, a die mechanism movable longitudinally of said length of tube and which mechanism is engageable with the outer surface of said length of tube to reduce the diameter and increase the length of the same upon relative rotational movement of said length of tube with respect thereto, a mandrel adapted for insertion into the bore of said length of tube from the other end thereof, a tailstock housing spaced longitudinally from said first chuck which housing is located on the opposite side of said die mechanism from said first chuck and is movable to various different fixed positions along said longitudinal tube axis, a tubular member mounted on said housing for sliding movement relative to said housing along said longitudinal tube axis, a second chuck rotatably mounted on the forward end of said tubular member for engaging and rotatably supporting said other end of said length of tube for rotation about its longitudinal axis, a mounting member positioned in the bore of said tubular member and fixedly secured to said housing, a spindle rotatably mounted on the forward end of said mounting member for supporting, said mandrel for rotation about said longitudinal axis of said length of tube and for restraining said mandrel against movement along said longitudinal axis, and an hydraulic cylinder connected with said tubular member for moving the same relative to said housing in a direction away from said first chuck with the result that said second chuck exerts a tension force on said tube tending to lengthen the same while said mandrel remains fixed relative to said longitudinal tube axis.

10. The combination in a tube drawing machine of, means for supporting a tube for rotation about its longitudinal axis, a die housing mounted for longitudinal movement with respect to said tube, means for rotating said tube with respect to said die housing and for simultaneously moving said die housing longitudinally of the tube along a continuous portion of its length, a slide plate connected with said die housing and having an opening therethrough for receiving a tube to be rolled, a plurality of slide block assemblies arranged in angularly spaced relation about the longitudinal axis of a tube passing through said opening and mounted on said slide plate for radial sliding movement relative to said axis and each of which assemblies includes a slide block having a roller on its radially inner end, a cam supporting member located in said die housing and which supporting member surrounds and is movable angularly with respect to said slide plate, a plurality of cams on said supporting member each of which cams engages the radially outer end of a respective one of said slide block assemblies and which cams are so dimensioned and arranged as to collectively move said slide block assemblies radially and in the same direction upon angular movement of said supporting member relative to said slide plate, a generally radially extending follower connected with said cam supporting member, a cam having an elongated cam surface spaced from and generally parallel with said longitudinal tube axis, the outer end of said follower being engageable with said latter cam surface so that said cam surface controls the angular position of said follower and consequently the radial position of said slides as the follower is moved longitudinally of said cam surface, yieldable means for urging said follower arm downwardly toward said cam surface so as to normally hold said follower in firm engagement with said cam surface while allowing it to rise and fall in accordance with variations in the height of said cam surface, and an adjustable stop means which overrides the action of said elongated cam to prevent further angular movement of said follower arm in a downward direction when the height of the cam surface of said latter cam falls below a given height as determined by the adjustment of said stop means.

11. The combination as defined in claim 10 further characterized by said adjustable stop means comprising coengaging stop means on said housing and on said follower arm for limiting the downward movement of said follower arm, the said coengaging stop means comprising an abutment on one of said latter parts and a stud threadably received by the other of said latter parts.

References Cited by the Examiner

UNITED STATES PATENTS

| 573,877 | 12/96 | Holmgren | 80—12 |
|---|---|---|---|
| 1,298,999 | 4/19 | Moltrup | 205—1 |
| 1,510,586 | 10/24 | Davis | 80—11 |
| 1,930,161 | 10/33 | De Wald | 29—33.6 |
| 2,101,357 | 12/37 | Assel | 80—13 |
| 2,152,437 | 3/39 | Lear | 29—33.6 XR |
| 2,156,584 | 5/59 | Benedetti | 80—56 |
| 2,525,687 | 10/50 | Kritscher | 80—56 |
| 2,661,526 | 12/53 | Bruegger | 80—13.3 |
| 2,737,073 | 3/56 | Haas | 82—31 |
| 2,778,253 | 1/57 | Brownstein | 80—11 |
| 2,910,905 | 11/59 | Gamet | 82—31 |
| 3,019,678 | 2/62 | Le Fiell | 80—14 |

FOREIGN PATENTS

| 453,979 | 1/49 | Canada. |
| 921,869 | 12/54 | Germany. |
| 590,075 | 7/47 | Great Britain. |
| 118,676 | 9/58 | Russia. |

CHARLES W. LANHAM, *Primary Examiner.*

WILLIAM W. DYER, JR., *Examiner.*